United States Patent

[11] 3,628,552

| [72] | Inventor | Hansjoerg Stern |
| | | Scotia, N.Y. |
| [21] | Appl. No. | 23,255 |
| [22] | Filed | Mar. 27, 1970 |
| [45] | Patented | Dec. 21, 1971 |
| [73] | Assignee | General Electric Company |

[54] FLUID AMPLIFIER TORSIONAL SPEED REFERENCE
9 Claims, 4 Drawing Figs.

| [52] | U.S. Cl. | 137/81.5 |
| [51] | Int. Cl. | F15c 3/00 |
| [50] | Field of Search | 137/81.5 |

[56] References Cited
UNITED STATES PATENTS

| 3,171,422 | 3/1965 | Evans | 137/81.5 |
| 3,399,688 | 9/1968 | Westerman, Jr. | 137/81.5 |
| 3,410,290 | 11/1968 | Phillips | 137/81.5 |
| 3,454,025 | 7/1969 | Egli | 137/81.5 |
| 3,457,938 | 7/1969 | Taplin et al. | 137/81.5 X |
| 3,489,161 | 1/1970 | Rexford | 137/81.5 X |
| 3,500,850 | 3/1970 | Kelley | 137/81.5 |
| 3,511,258 | 5/1970 | Palmer | 137/81.5 |

Primary Examiner—Samuel Scott
Attorneys—Frank L. Neuhauser, Oscar B. Waddell, Joseph B. Forman, David M. Schiller and Arthur E. Fournier ABSTRACT: A speed reference for fluid amplifier speed controls utilizes a torsional pendulum comprising a taut wire having in the middle thereof an aerodynamically shaped mass.

Inventor:
Hansjoerg Stern,
by Paul G. Frank
His Attorney.

FLUID AMPLIFIER TORSIONAL SPEED REFERENCE

In the prior art, various speed references have been proposed for fluid amplifier speed controls. However, such references as have been provided, for example, reed and tuning fork references, have suffered from one or more deficiencies. Reed or tuning fork references may at times be undesirable since they are adversely affected by external vibrations and their resonance characteristics may be hard to match with the system's requirements. Further, their frequency is not readily adjustable in operation.

In view of the foregoing, it is therefore an object of this invention to provide an improved reference for fluid amplifier speed controls.

It is a further object of the present invention to provide a fluid amplifier speed reference that is less sensitive to external vibrations than those of the prior art.

It is a further object of the invention to provide a fluid amplifier speed reference whose resonance characteristics are readily matched to the system's requirements.

Yet another object of the present invention is to provide a speed reference for fluid amplifier speed controls whose frequency is readily adjustable in operation.

The foregoing objects are achieved in the present invention wherein there is provided a torsional pendulum consisting of a taut wire in the central area of which is suspended a mass of inertia. By proper aerodynamic shaping of this mass, it is possible to induce torsional oscillation of the mass by causing a stream of fluid to flow across it. The deflection of the stream can then be sensed by a suitably arranged receiver. The amplitude of the oscillation of the torsional pendulum motion can then be detected in the receivers. In another embodiment of the present invention, a modulated fluid flow is used to drive the torsional pendulum. In this embodiment, both amplitude and phase variations are induced by the pendulum. The amplitude and phase variations are frequency dependent, in much the same way as a tuned circuit affects an electrical signal. Thus, this device can be used as an error sensor in devices such as speed governors. The error signal thus produced can be converted into an analog signal by any suitable device.

Frequency adjustment of this torsional pendulum may be attained by maintaining tension on the supporting wire while sliding anvil elements restraining the wire towards the rotating or torsional mass. These anvil elements, by changing the length of wire that is twisting, can be used to change the resonant frequency of the torsional pendulum.

A better understanding of the present invention may be obtained by considering the following detailed description in conjunction with the attached drawings in which.

Figure 1:
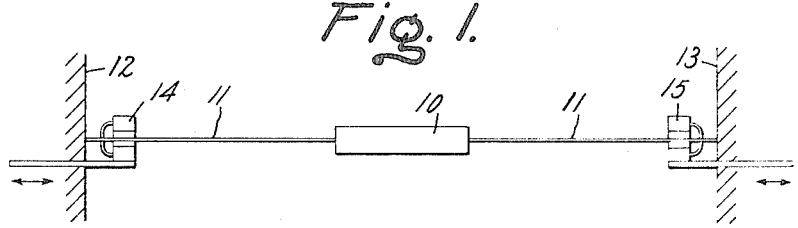
FIG. 1 illustrates one view of the torsional pendulum constructed in accordance with the present invention.

Referring to FIG. 1 there is shown a torsional pendulum constructed in accordance with the present invention. The torsional pendulum comprises a mass or inertia 10 attached to a taut wire 11 which is suspended between two support elements 12 and 13. Holding the ends of taut wire 11 are a pair of anvil elements 14 and 15, which as will be described later, serve also to vary the length of wire 11 that is twisted by mass 10.

Figure 2:
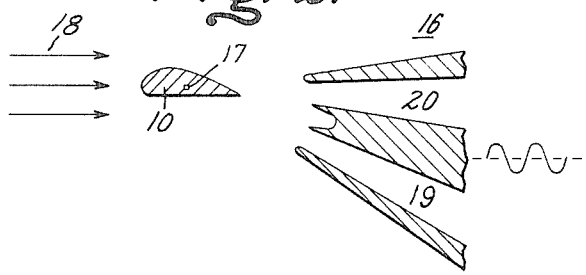
FIG. 2 illustrates a sectional view of a torsional pendulum driven by a steady state fluid flow.

In FIG. 2 there is illustrated a cross section of the torsional pendulum system shown in FIG. 1. In FIG. 2, mass 10 has an aerodynamic shape and is located upstream from a receiving element 16 in driving fluid 18. Aerodynamic mass 10 is attached to the taut wire at point 17 and oscillates about this point as it is driven by the movement of fluid 18. The receiving element 16 is shown as comprising a pair of channels 19 and 20. As aerodynamic mass 10 oscillates about the point 17 it varies the flow of fluid to channels 19 and 20, depending upon where in its cycle the oscillating mass is.

As illustrated in FIG. 2, aerodynamic mass 10 is attached at point 17 to a wire of square cross section. For reasons that will become clearer below, it is preferable to use square wire or cruciform wire since a better torsional grip may be obtained with this type of wire than would be obtained utilizing a round wire. In FIG. 1, a pair of anvil elements 14 and 15 are shown as being slidably mounted on the taut wire suspended between support elements 12 and 13. These sliding anvil elements serve to adjust the frequency of the oscillating mass 10 by varying the length of the wire that is twisted by mass 10 during its oscillations. Thus, in order to obtain a better grip on the wire, the use of a noncircular cross section wire is preferred. The anvil elements may be of any suitable type, for example, pinch roller or frictional engagement.

Figure 3:
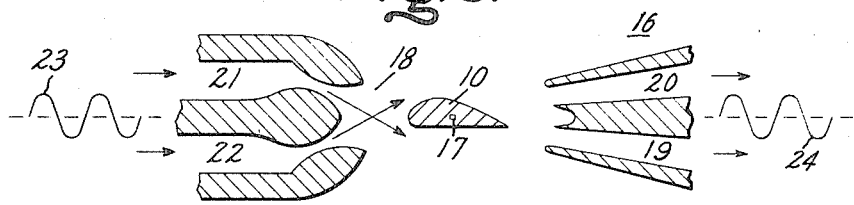
FIG. 3 illustrates a sectional view of a torsional pendulum driven by a modulated fluid flow.

In FIG. 3 there is illustrated another embodiment of the present invention wherein the torsional pendulum 10 is driven by a modulated fluid flow. In this embodiment, an input signal, such as represented by waveform 23 is applied to pendulum 10 by a pair of channels 21 and 22. Channels 21 and 22 may be considered to contain the upper and lower portions, respectively, of input waveform 23. As shown in FIG. 3, the flow from channels 21 and 22 tends to twist aerodynamic mass 10 about its point of support 17 first in one direction and then in another. The resulting fluid flow to receiver 16 is then a combination of input signal 23 attempting to drive the pendulum at one frequency and the natural frequency of the pendulum itself. The input fluid flow 18, as illustrated in FIG. 3, may be considered transversely modulated, i.e., it is modulated by switching the flow from side to side as opposed to sound in which the modulation is longitudinal; although, obviously, there is also a longitudinal component to the flow. The effect of the pendulum on the phase and amplitude of input signal 23 is illustrated in FIG. 4.

Figure 4:
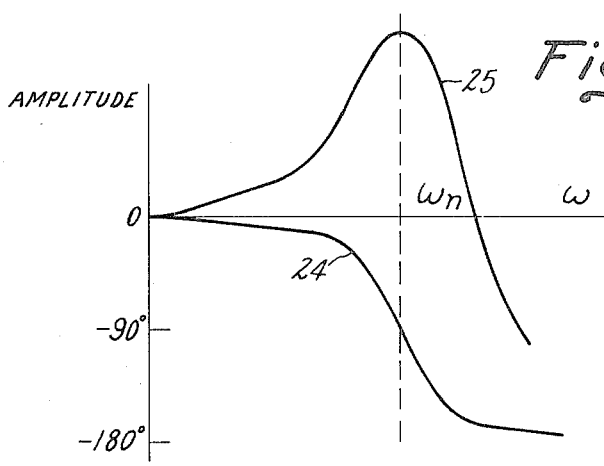
FIG. 4 illustrates the operation of the present invention when the torsional pendulum is excited by a modulated excitation fluid flow.

FIG. 4 illustrates a pair of curves showing the overall operation of the torsional pendulum. Curve 25 is a resonant curve of amplitude versus frequency, when the torsional pendulum is driven by a modulated fluid flow as shown by FIG. 3. Curve 24 represents the relative phase displacement between the torsional pendulum output signal and the modulated input signal fluid flow. As can be seen from FIG. 4, the amplitude versus frequency characteristic of the resonance curve peaks at the resonant frequency $\omega_n$ and the relative phase displacement between the driving fluid and oscillating mass 10 is $-90°$ at the resonant frequency $\omega_n$. Thus, as noted above, the torsional pendulum can act as a reference in a speed governor system, or as the reference element in a fluidic servo system.

Having thus described the invention, it will be apparent to those of skill in the art that various modifications may be made. For example, oscillating mass 10 need not have the straight sided configuration as shown in FIG. 1. A mass of any desired shape exhibiting lift may be used as the oscillating mass. Further, a torsional suspension from both sides of the mass need not be used. Also, the modulated fluid flow need not be bidirectional as shown, but can be uni- or multidirectional. Further, the mass and the taut wire can be combined in the form of a ribbon, which will exhibit the same characteristics.

What I claim as new and desire to secure by Letters Patent of the United States is:

1. A fluid amplifier control frequency reference comprising:
   support means,
   torsional mounting means connected to said support means,
   an aerodynamically shaped body attached to said torsional mounting means so as to oscillate, when enabled, with said torsional mounting means as an axis of rotation,
   fluid means for directing a flow of fluid across said aerodynamically shaped body to induce said oscillations therein, and
   anvil means slidably connected to said torsional mounting means and said support means so as to vary the amount of said torsional mounting means subject to torsional stress by said aerodynamically shaped body.

2. Apparatus as set forth in claim 1 wherein said support means comprises:
two support members spaced along the axial length of said torsional mounting means, one to either side of said aerodynamically shaped body.

3. Apparatus as set forth in claim 1 further comprising:
receiving means spaced downstream from said aerodynamically shaped mass for sensing oscillations thereof.

4. Apparatus as set forth in claim 3 wherein said receiving means comprises:
a plurality of channels spaced relative to the downstream side of said aerodynamically shaped body so that oscillations of said aerodynamically shaped body vary the relative amounts of fluid flow in said plurality of channels.

5. Apparatus as set forth in claim 1 wherein said torsional mounting means comprises a wire of square cross section whose length subject to torsional stress is varied by said anvil means.

6. Apparatus as set forth in claim 5 wherein said support means comprises:
two support members spaced along the axial length of said wire, one to either side of said aerodynamically shaped body.

7. Apparatus as set forth in claim 6 further comprising:
receiving means spaced downstream from said aerodynamically shaped mass for sensing oscillations thereof.

8. Apparatus as set forth in claim 1 wherein said fluid means comprises a source of modulated fluid flow.

9. Apparatus as set forth in claim 8 wherein said source of modulated fluid flow modulates the fluid flow transversely.

* * * * *